Figure 1:
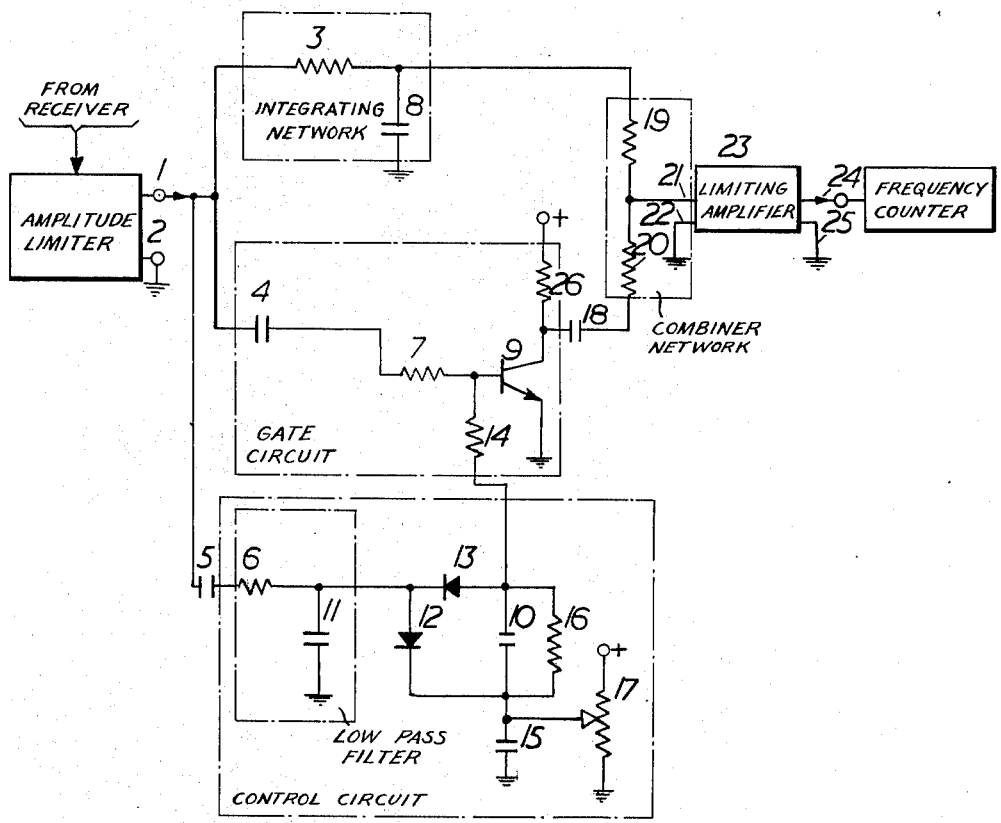

Jan. 25, 1966 W. L. GARFIELD ETAL 3,231,823
SPURIOUS NOISE SUPPRESSION CIRCUIT INTEGRATING LOW
FREQUENCIES, BY-PASSING HIGH FREQUENCIES
Filed July 10, 1962 2 Sheets-Sheet 2

Inventors
WILLIAM L. GARFIELD
ALEXANDER H. BABB
By
Attorney 3,231,823
SPURIOUS NOISE SUPPRESSION CIRCUIT INTEGRATING LOW FREQUENCIES, BY-PASSING HIGH FREQUENCIES
William Littery Garfield and Alexander Hammond Babb, London, England, assignors to International Standard Electric Corporation, New York, N.Y., a corporation of Delaware
Filed July 10, 1962, Ser. No. 208,739
Claims priority, application Great Britain, July 21, 1961, 26,587/61
2 Claims. (Cl. 328—165)

This invention relates to a radio altimeter receiver which includes a circuit for the suppression of pulse type interference superimposed on a received signal.

In the signal output from a radio receiver it is often difficult to distinguish between wanted signals and spurious signals produced by the response of the receiver to such interfering pulse type signals.

In a radio receiver in which the received signal is amplitude limited and the desired information is derived by counting the transitions of the resultant signal wave, the presence of interfering signals may give rise to spurious transitions to which the counter circuit responds.

An example of a receiver circuit arrangement in which errors resulting from spurious transitions are likely to occur is a radio altimeter receiver of the type which operates by counting the transitions of a signal wave. The particular embodiment of the invention to be described is used in a radio altimeter receiver in which a frequency modulated signal radiated from a transmitting antenna and reflected into a receiving antenna is beaten in a mixer stage with a further signal received from the transmitter by a direct path along a cable. From the mixer a beat signal is derived having a frequency which is proportional to the height of the aircraft above the ground. The frequency of the beat signal is measured by amplifying and amplitude limiting the beat signal and counting the transitions of the limited signal wave in a frequency counter.

The presence of interfering pulse type signals may cause spurious transitions of the limited signal wave which are also counted by the frequency counter. This results in a measurement of the beat signal frequency which is too high and a height reading which is correspondingly in error. These errors in height-reading are particularly undesirable in the case of auto-land systems, where the height information is normally fed to the aircraft flight controls without the intervention of the pilot.

Mutual interference by pulse type signals may occur when two or more similar F.M. radio altimeters are used in a single aircraft, as a result of the production of spurious beat signals by the coincidence of transmitter frequencies at various times during the modulation cycle.

This invention provides a means to reduce errors due to pulse type interference.

According to the invention there is provided a radio altimeter receiver including a first amplitude limiter and a frequency counter, an integrating network coupled to an output from the first amplitude limiter, a gate circuit having an input coupled to an output from the first amplitude limiter, a combiner network coupled to an output from the integrating network and an output from the gate circuit, a second amplitude limiter having an input coupled to an output from the combiner network and having an output coupled to an input to the frequency counter, a control circuit coupled to an output from the first amplitude limiter and responsive to the frequency of signals therefrom, and having an output coupled to an input to the gate circuit in such a way as to control the magnitude of a signal therefrom in accordance with the fundamental frequency of the signal output from the first amplitude limiter.

Figure 2:
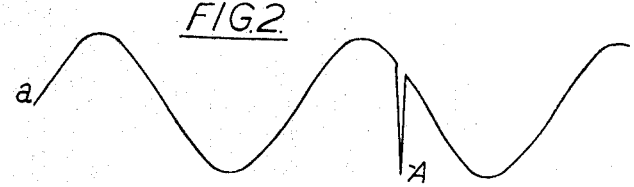
Figure 2:
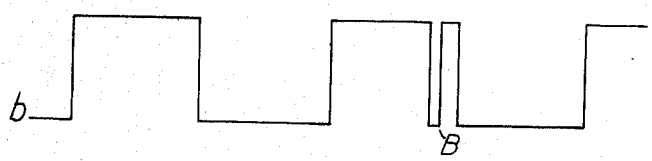
Figure 2:
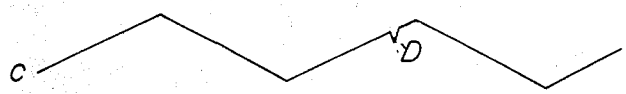
Figure 2:
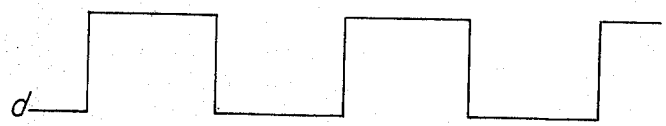
Figure 2:
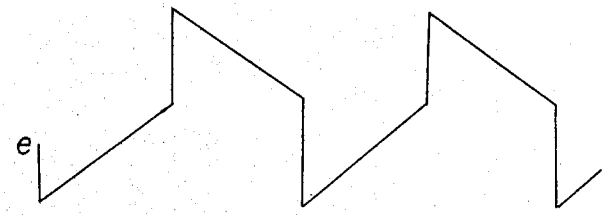

An embodiment of the invention which forms part of a radio altimeter receiver will now be described with reference to the accompanying drawing which shows in FIG. 1 a circuit diagram of the embodiment, and in FIG. 2 illustrations of signal waveforms at various points of the circuit.

Referring to FIG. 1 there is shown a pair of input terminals 1 and 2 to the circuit arrangement. A resistor 3 and a capacitor 8 form an integrating network which is directly connected across terminals 1 and 2. The collector of the transistor 9 is connected via a resistor 26 to the positive terminal of a D.C. supply source, the negative terminal of which is connected to ground. The emitter of the transistor 9 is connected directly to ground, and the base is connected to a control signal source via a resistor 14 and also to terminal 1 of the input terminals 1 and 2 via a resistor 7 and a blocking capacitor 4. The transistor 9 in association with the above-mentioned components forms the gate circuit. Resistors 19 and 20 in conjunction with the effective impedance across the input terminals 21 and 22 of a limiting amplifier 23 form a combiner network. The output from the integrating network is directly connected to the resistor 19 of the combiner network, the output from the gate circuit is coupled via a D.C. blocking capacitor 18 to the resistor 20 of the combiner network. The output terminals of the limiting amplifier 23 are shown at 24 and 25.

The control circuit is coupled to the input terminals 1 and 2 of the circuit arrangement by a blocking capacitor 5 and includes a low-pass filter network formed by a resistor 6 and a capacitor 11, and a rectifier circuit formed by the diodes 12 and 13, a bypass capacitor 15, a reservoir capacitor 10, and a load resistor 16. In addition, the control circuit includes a resistive potentiometer 17 connected across a D.C. source, the slider of the potentiometer 17 connected to the junction of the capacitors 10 and 15, and a resistor 14 connected between one plate of the capacitor 10 and the base of the transistor 9.

The beat signal derived from the receiver mixer is limited in the first amplitude limiter and applied to the input terminals 1 and 2 of the embodiment. The beat signal waveform is substantially sinusoidal prior to limiting. FIG. 2a illustrates such a signal wave form having a severe distortion, shown at A, due to the presence of interfering pulse signals.

FIG. 2b illustrates the corresponding signal wave form applied to the input terminals 1 and 2 of the embodiment from the output of the first amplitude limiter. The waveform at terminals 1 and 2 is substantially square and, in this case, contains a spurious transition shown at B in FIG. 2b owing to the distortion shown at A in FIG. 2a. The dynamic range of the first amplitude limiter covers a small range of the signal magnitude in the region of the zero crossover points and, unless the interfering pulse is sufficiently large to produce a spurious cross-over of the signal wave, no spurious transition will be obtained in the output from the first amplitude limiter.

The signal applied to terminals 1 and 2 (FIG. 1) is applied directly to the integrating network formed by the resistor 3 and the capacitor 8, and also, via the capacitor 4 and the resistor 7 to the base of the transistor 9. The time constant of the integrating network is such that integration occurs throughout the repetition frequency range of the applied signal which, in this embodiment, is from 1 kc./s. to 100 kc./s. The waveform of the integrated signal across the capacitor 8 is illustrated in FIG. 2c. The amplitude of the distortion D of the limited signal wave, has been considerably reduced by the integrating network. The applied signal is attenuated by the integrating network by an amount which increases with the frequency of the applied signal.

Referring to FIG. 1 the operation of the gate circuit comprising the transistor 9, and the resistors 26, 14 and 7 is controlled by the bias applied to the base of the transistor. The gate circuit functions as an "inhibit" gate, for when the control signal applied to the base through the resistor 14 is below a certain value, a signal applied to the input terminals 1 and 2 will pass through the transistor 9 and reach terminals 21 and 22 via the capacitor 18 and the resistor 20. When the control signal exceeds a certain value the transistor 9 will be cut-off and a signal applied to the input terminals 1 and 2 will reach terminals 21 and 22 via the integrating network and the resistor 19 only.

Due to the frequency response of the low pass filter network formed by the resistor 6 and the capacitor 11, the amplitude of the signal applied to the rectifier circuit, formed by the diodes 12 and 13 and the capacitors 10 and 15, decreases progressively as the frequency of the signal increases. The magnitude of the D.C. voltage developed across the capacitor 10 therefore decreases as the received signal frequency increases. Therefore the magnitude of the reverse bias applied to the base of the transistor 9 also decreases progressively as the beat signal frequency increases.

At beat signal frequencies from 12 kc./s. downwards the transistor 9 is biased beyond cut-off, so that only the integrated signal appears at the input terminals 21 and 22 of the limiting amplifier 23. The signal which appears across the output terminals 24 and 25 of the limiting amplifier 23 is fed to the frequency counter, (not shown). The waveform of the signal across terminals 24 and 25 is illustrated in FIG. 2d. The signal has been restored to a square waveform by the action of the limiting amplifier.

The signal wave is now free from the spurious transition shown at B in FIG. 2b, owing to the combined effect of the integrating network and the limiter amplifier 23 of FIG. 1.

As the beat signal frequency is increased above 12 kc./s., the amplitude of the integrated signal applied to the limiting amplifier 23 eventually becomes too small to be conveniently amplified back to a usable level by the limiting amplifier 23. The potentiometer 17 is adjusted so that at beat signal frequencies just above 12 kc./s. the reverse bias on the base of the transistor 9 has dropped sufficiently to allow the transistor to conduct during the positive peaks of the signal wave and apply a signal to the input terminals 21 and 22 via the capacitor 18 and the resistor 20. The amplitude of this signal, which is of substantially square waveform, but reversed in phase compared with the signal at terminals 1 and 2, increases with increasing signal frequency. At 15 kc./s. the transistor 9 conducts over the whole of each cycle of the input signal applied to the base and the signal at the terminals 21 and 22 consists almost entirely of the square wave output from the transistor 9, the integrated signal amplitude being negligible in comparison. This condition obtains up to the maximum frequency used (approximately 100 kc./s.). When the amplitude of the two signal components are equal the combined signal waveform, in the absence of interference pulses, will be similar to that illustrated in FIG. 2e. The square wave component of the combined signal applied to the limiting amplifier will be distorted by spurious transitions to the same extent as the signal applied to the output terminals 1 and 2 of the circuit arrangement. As the beat signal frequency increases above about 12 kc./s. the interference suppression is therefore effectively reduced. It follows that as the aircraft height increases above a certain value the absolute magnitude of the height-reading error will, in the presence of interference pulses, tend to increase accordingly. The percentage error of the output signal from the frequency counter, for interference of a given level, decreases with increasing aircraft height, since the magnitude of the output signal from the counter is proportional to the aircraft height. The percentage error of the height reading does not therefore increase with increase in altitude, despite the reduction in the effective interference suppression. On the other hand the maximum interference suppression is provided at the lower altitudes where the greatest accuracy of the height-reading is required.

While we have described above the principles of our invention in connection with specific apparatus, it is to be clearly understood that this description is made only by way of example and not as a limitation to the scope of our invention as set forth in the objects thereof and in the accompanying claims.

What we claim is:

1. A noise suppression circuit comprising a source of signals, a first amplitude limiter coupled to said source of signals, an integrating network, a gate circuit, a control circuit, means coupling said integrating network, gate and control circuits to the output of said first amplitude limiter, said control circuit being responsive to the frequency of signals from said first amplitude limiter and comprising means to derive a varying bias from said signal, a source of consant bias, means to combine both varying and direct bias, means to couple said combined bias to said gate circuit to cause said gate circuit to become non-conductive at signal frequencies below a given frequency and to become conductive at frequencies above said given frequency, a combining circuit, means coupling the output of said integrating circuit and said gate circuit to said combining circuit, a second amplitude limiter coupled to the output of said combining circuit and a frequency counter coupled to the output of said second amplitude limiter.

2. A noise suppression circuit comprising a source of signals, a first amplitude limiter coupled to said source of signals, an integrating network, a gate circuit including a transistor having base, emitter and collector electrodes, a control circuit, means coupling said integrating network, gate and control circuits to the output of said first amplitude limiter, said control circuit being responsive to the frequency of signals from said first amplitude limiter and comprising means to derive a varying bias from said signal, a source of constant forward bias, means to combine both varying bias and constant forward bias, means to couple asid combined bias to the base of said transistor to cause said transistor to become non-conductive at frequencies below a given frequency and conductive at frequencies above said given frequency, a combining circuit, means coupling the output of said integrating circuit and said gate circuit to said combining circuit, a second amplitude limiter coupled to the output of said combining circuit and a frequency counter coupled to the output of said second amplitude limiter.

References Cited by the Examiner

UNITED STATES PATENTS

| 2,606,972 | 8/1952 | Scott | 328—167 |
| 3,011,128 | 11/1961 | Filipowsky | 328—127 |
| 3,021,488 | 2/1962 | Edson | 328—140 |
| 3,048,789 | 8/1962 | Herzog | 307—88.5 |
| 3,096,447 | 7/1963 | Hill et al. | 307—88.5 |

ARTHUR GAUSS, *Primary Examiner.*

JOHN W. HUCKERT, *Examiner.*